March 25, 1930.  R. H. HUMMERT  1,751,863
SPOTLAMP FOR AUTOMOBILES AND THE LIKE
Filed Dec. 20, 1926
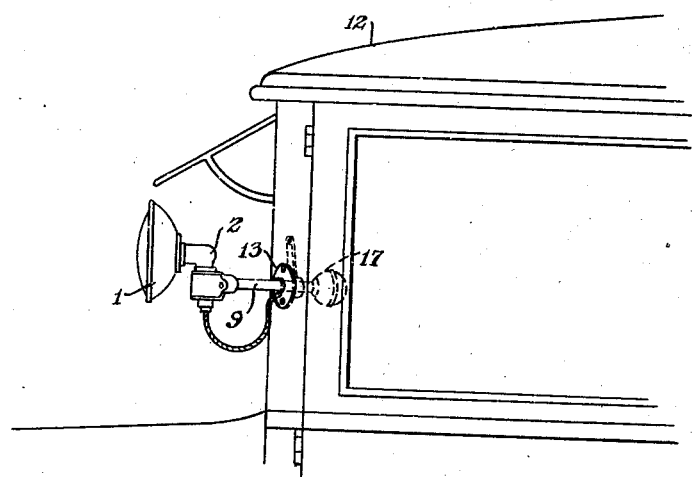
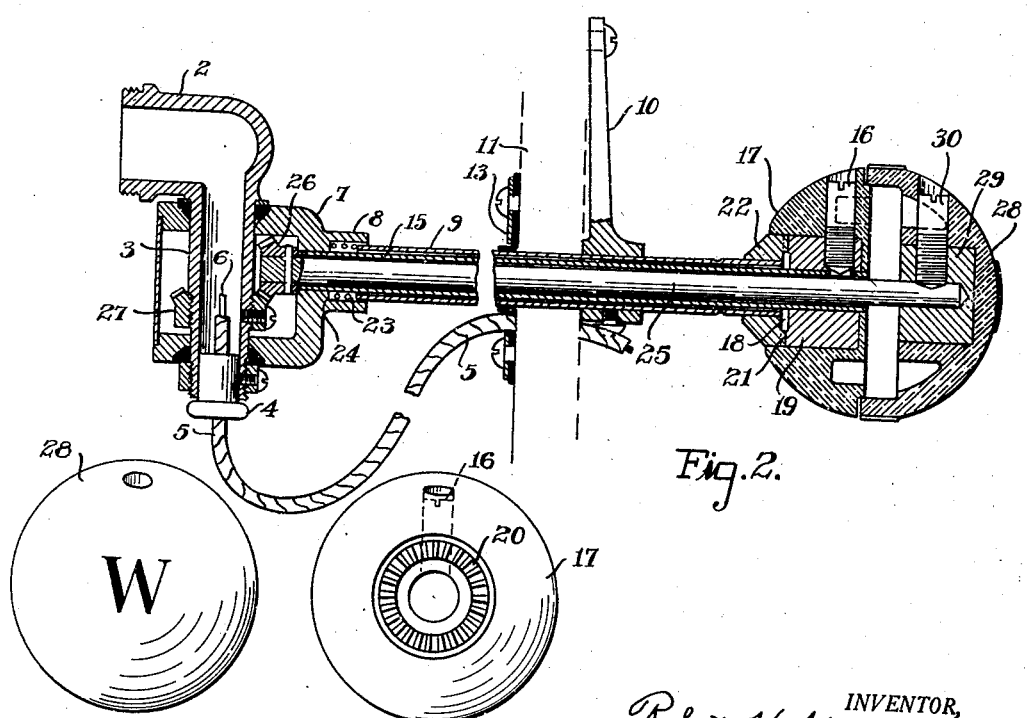

Patented Mar. 25, 1930

1,751,863

UNITED STATES PATENT OFFICE

ROBERT H. HUMMERT, OF DAYTON, OHIO, ASSIGNOR TO THE S. H. THOMSON MANUFACTURING COMPANY, OF DAYTON, OHIO, A CORPORATION OF OHIO

SPOTLAMP FOR AUTOMOBILES AND THE LIKE

Application filed December 20, 1926. Serial No. 155,836.

This invention relates to new and useful improvements in spot lamps for automobiles and the like.

It is one of the principal objects of my invention to provide a spot lamp structure in which the clutch for holding the lamp in an adjusted position is concealed within the operating handle. The clutch teeth are thus removed from an exposed position where they are apt to pinch the operator's fingers during the actuation of the lamp. This feature also tends to make the lamp structure simpler and more attractive.

It is another object of my invention to provide for such a spot lamp, a spherical operating handle for displaying a monogram.

Other important and incidental objects will be brought out in the following specification and particularly set forth in the subjoined claims.

In the accompanying drawings illustrating my invention, Figure 1 is a side elevational view of the front portion of an automobile body, showing my improved spot lamp attached to a front corner post of the same. Figure 2 is a longitudinal, sectional view taken through said spot lamp structure. Figure 3 is a face view showing the serrated clutch collar insert. And Figure 4 is a rear view of the spherical operating handle, showing the monogram thereon.

Referring to the accompanying drawings for a detailed description of my invention, the numeral 1 designates a spot lamp which is mounted on an L-shaped extension 2 of a vertical shaft 3. The latter is hollow at its lower end to receive a rubber grommet 4 for securing to the shaft 3 a metal hose 5 to receive an electric cord 6 that conducts electric current to the spot lamp 1.

The shaft 3 is pivoted within a bracket or housing 7 which terminates at its rear end in a cylindrical portion 8 having a hollow center in which there is loosely fitted one end of a tube 9 about which said housing 7 is free to rotate. Secured to the tube 9 is a bracket arm 10 attachable to a front corner post 11 of an automobile 12 after the tube 9 has been passed through a hole in said post and in an elliptical plate 13 secured to the outer face of the latter. The hole in said plate and in the corner post 11 is extended at its lower part to permit the passage therethrough of the metal hose 5 carrying the electric cord 6 for supplying electric current to the lamp 1.

Free to rotate in the sleeve 9 is a hollow shaft 15 that projects into the cylindrical end 8 of the housing 7 for firm attachment to it. Fixedly secured to the outer end of the hollow shaft 15 by a screw 16 is a semi-spherical handle portion 17 preferably made of a phenolic condensation product such as bakelite. This handle portion 17 has a central recess 18 of uniform diameter in which there is molded a brass collar 19 through a hole in which the attaching screw 16 projects. Formed on the front face of the collar 19 are serrations or teeth 20 which mate with teeth or serrations 21 on a collar 22 fixedly secured to the sleeve or tube 9. (See Figures 2 and 3.) The teeth 20 on the insert 19 are normally in engagement with the teeth 21 on the collar 22 to securely hold the spot lamp in an adjusted position. This engagement between the teeth is effected by a compression spring 23 which surrounds the hollow shaft 15 between a shoulder 24 formed within the cylindrical end 8 of the housing 7 and the inner end of the bearing sleeve 9.

When it is desired to rock the spot lamp 1 about the horizontal axis of the shaft 15, the handle portion 17 is pulled outwardly against the compression of the spring 23 to disengage the teeth of the insert 19 from the teeth of the collar 22, whereupon the shaft 15 may be easily turned by the knob to bring the lamp 1 bodily to a desired position.

For the purpose of rotating the spot lamp 1 about the vertical axis of the shaft 3, there is provided a shaft 25 which passes through the hollow shaft 15 in which it is free to rotate. Fixedly secured to the front end of this shaft 25 within the housing 7 is a bevel gear 26 that is in mesh with a bevel gear 27 fast on the vertical shaft 3 within said housing. Through the bevel gear connection between the shafts 3 and 25, the spot lamp 1 may be rotated about the vertical axis of the shaft 3 when the shaft 25 is turned by the following means.

Referring to Figures 2 and 4, the numeral 28 designates a semi-spherical handle portion preferably made of a phenolic condensation product such as bakelite. The handle portion 28 is complemental to the handle portion 17 to form with the latter a sphere, and is adapted to display on its rear portion a monogram such as the letter "W" shown in Figure 4.

The handle portion 28 is formed with a central recess in which is molded a brass insert 29 which, together with said handle portion, is fixedly secured to the outer end of the shaft 25 by a radial screw 30. (See Figure 2.) By turning this handle portion 28, the spot lamp 1 may be rotated to a desired position about the vertical axis of the shaft 3 irrespective of the position of the handle portion 17.

It will now be seen that the two separate semi-spherical handle controls 17 and 28 form together an attractive spherical unit which houses the clutch for holding the spot lamp in an adjusted position. A source of danger to the operator's hand is thus removed, and the lamp structure made more simple, compact and pleasing.

Having described my invention, I claim:

1. In combination with a shaft, of a hollow operating member secured to the outer end of the latter, and having an inset serrated face, a sleeve into which the shaft projects for a turning movement therein, a collar secured to the sleeve and having a serrated face portion projecting into the operating member for engagement by the serrated portion of the latter.

2. In combination with a shaft, a hollow operating member, an insert formed with teeth on its outer side, tightly secured within said operating member, a sleeve into which the shaft projects for a turning movement therein, and a collar secured to the sleeve for projection into the operating member and having teeth formed on its outer face for engagement by the teeth on said insert within the operating member, for the purpose specified.

In testimony whereof I have hereunto set my hand this 17th day of December, 1926.

ROBERT H. HUMMERT.